3,663,469
PARTICLE-CONTAINING ELASTIC POLY-
URETHANE LAYER
Joseph A. Weissmahr, Rome, Italy, assignor to Wertex
Anstalt, Vaduz, Liechtenstein
No Drawing. Filed Oct. 17, 1969, Ser. No. 867,386
Claims priority, application Italy, Nov. 7, 1968,
40,972/68
Int. Cl. C08f 47/08; C08g 22/44, 41/04
U.S. Cl. 260—2.5 BE    6 Claims

ABSTRACT OF THE DISCLOSURE

An elastic layer of polyurethane is prepared by binding granulated elastic material with a liquid polyurethane composition which cures to a resilient solid product. When the spaces between the granulated material is only partially filled with the liquid, a porous article results.

---

This invention relates to polyurethane compositions. More specifically, the invention relates to elastic polyurethane compositions; containing from 50 to 80% by volume of granulated elastic material and a method of preparing the same.

Polyurethane materials are plastic or elastic materials which are obtained through a chemical reaction between a polyester or a polyether and a poly-isocyanate. An abbreviated equation for the chemical reaction is

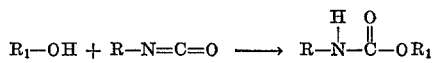

Elastic materials can be obtained by using long-chain linear polyesters or polyethers together with bi-functional isocyanates. The two liquid components are mixed before use, and the elastic polyurethane forms by chemical reaction.

Compounds of elastic polyurethanes are employed to cover floors and to protect industrial machinery. Recently, elastic polyurethane compounds have found a novel application in covering tennis courts, athletic fields and play courts with the purpose of providing a surface having good resiliency and durability and requiring little maintenance.

These surfaces consist of prefabricated sheets made of polyurethane material having a thickness of 2 to 20 millimeters, or else the compound is applied in a liquid form which, due to a chemical reaction, is transformed into a resilient solid material. Since the cost of the raw material is high, the surface so obtained is very costly.

The efforts of reducing the cost of the material through incorporation of powdered fillers have been unsuccessful due to the loss of elasticity caused when the filler constitutes more than 20–30% by volume of the composition, rendering the product useless.

Fillers in the form of granules can be employed with presently known methods only up to a limited percentage, because of the difficulties encountered when mixing the two components of the polyurethane with the simultaneous addition of the granules. Another difficulty is due to the fact that the adhesion between the granules and the polyurethane material is insufficient, unless an additional adhesive substance is used to guarantee a suitable product.

One purpose of the present invention consists in the preparation of mixtures of resilient polyurethane compounds with a high percentage of granulated elastic material.

The sheets of the prior art, are provided with a surface structure which confers anti-skid properties to the end product. After a certain period of use, the surface structure wears off leaving a surface which is smooth and slippery.

Another purpose of the invention is, therefore, the preparation of polyurethane sheets having incorporated throughout their thickness granules to provide anti-skid properties, even after the surface structure has worn out.

It has been discovered that the aforementioned aims can be achieved in the following way:

Granules or crumbs of vulcanized rubber scraps, granules of plastic foam, of rubber foam or other elastic, granulated or crushed material are mixed with a binding agent, such as an adhesive material based on a polyurethane or on synthetic or natural rubber latex. The mixture is cast into the desired form or shape, for instance a layer of 2 to 20 millimeters thickness. The layer is composed of elastic granules which occupy 50 to 80% of the total volume. The granules are covered by the binding agent in such way that at the contact points they are strongly bound to each other. After the layer has been formed and dried, the space between granules is filled, completely or partially, with a liquid polyurethane material, which transforms itself into a resilient solid material after a short chemical reaction. The binding agent which covers the granules is so selected as to assure good adhesion between the granules and the polyurethane which has been used to fill the spaces between granules.

In the above-mentioned way a solid resilient layer is obtained, the elasticity of which equals that of a polyurethane composition without elastic granules, while the anti-skid properties of the new product are decidedly superior.

The following examples are intended to illustrate but not to limit the invention.

EXAMPLE 1

8 kgs. of rubber scraps of a particle size of 1 to 4 millimeters, 2 kgs. of natural rubber latex (having a 60% solids content), 2 kgs. of synthetic rubber latex, of the 70:30 butadiene-styrene type (having a solids content of 50%), and 100 gms. of vulcanizing agents are mixed and cast into a layer 10 millimeters in thickness. The layer is vulcanized in a drier or at ambient temperature.

The resultant layer is composed of rubber granules bound to each other, which occupy 74% of the total volume. In order to assure good adhesion between the granules and the successively applied polyurethane material, an adhesive material is applied by spraying, the adhesive having the following composition:

|  | Parts by weight |
|---|---|
| Diphenylmethane diisocyanate | 100 |
| Xylene | 100 |
| Ethyl-glycol acetate | 60 |
| Branched polyether of 1,3 butylene glycol and trimethylolpropane | 20 |
| Poly(oxypropylene) glycol, mol wt. 1000 | 40 |

After 4 hours the solvent has completely evaporated, and the following two-component liquid composition is applied:

Component A:    Parts by weight
Polyester of 3 moles of azelaic acid and 3.3
  moles of 1,4 butylene glycol _____ 400
Diphenyl-chloride (plasticizer) _____ 360
10% solution in toluene of dibutyl tin dilaurate
  (catalyst) _____ 4

Component B:
Diphenylmethane diisocyanate _____ 50
Diphenyl-chloride (plasticizer) _____ 50

The A and B components are mixed together, and the liquid thus obtained is used to fill, partially or completely, the voids within the layer of rubber granules, previously prepared. After a chemical reaction of short duration, the liquid is transformed into a resilient solid material forming a single body with the layer of rubber granules.

EXAMPLE 2

5 kgs. of granulated or crushed vulcanized rubber scraps;
0.5 kg. of granulated rubber foam, and
1 kg. of adhesive material having the following composition:

| | Parts by weight |
|---|---|
| Branched polyether of 1,3 butylene glycol and trimethylolpropane | 20 |
| Poly(oxypropylene)glycol, mol wt. 1,000 | 40 |
| Diphenylmethane diisocyanate | 100 |
| Xylene | 80 |
| Aromatic solvent | 80 | are mixed together and cast into a layer having a 20 millimeter thickness. After the complete evaporation of the solvent (which occurs in 5-6 hours), a layer is obtained which is composed of granules bound to each other and occupying 76% of the layer volume.

Immediately thereafter, the two-component mixture is applied, as in the Example 1, in order to completely fill in the void spaces left in the previously prepared layer.

I claim:

1. An elastic polyurethane layer containing air spaces, comprising in combination 50 to 80% by volume of resilient particles, said particles being approximately 1 to 4 millimeters in diameter, 10 to 25% by volume of an elastic polyurethane adhesive or a synthetic rubber adhesive adhering said particles together into an agglomerate, the spaces between said agglomerated particles being partially filled by air and partially filled with an elastic polyurethane composition formed by curing at ambient temperature a substantially volatile solvent-free liquid mixture of an organic polyester or polyether, a plasticizer, an organic diisocyanate and an ambient temperature curing catalyst, said mixture being capable of solidifying at ambient temperature to a non-flowing state in a period of 2 to 15 minutes and thereafter to an elastic solid.

2. Elastic layer according to claim 1, wherein the resilient particles consist of vulcanized rubber scrap.

3. A layer according to claim 2, in which the spaces between said agglomerated particles are filled only in the upper half of the layer with the elastic polyurethane composition.

4. A process for preparing a particle-containing elastic polyurethane layer, comprising mixing 50 to 80% by volume of resilient particles of approximately 1 to 4 millimeters diameter with 10 to 25% by volume of an elastic polyurethane adhesive or synthetic rubber adhesive and forming a layer of the desired thickness, thereafter drying and curing the adhesive at ambient temperature and filling the voids left between said resilient particles completely or partially with a substantially volatile solvent-free liquid mixture of an organic polyester or polyether, a plasticizer, an organic isocyanate, and an ambient temperature curing catalyst, which causes said mixture to solidify at ambient temperature to a non-flowing state in a period of 2 to 15 minutes and thereafter to an elastic solid.

5. Process according to claim 4, in which the resilient particles consist of vulcanized rubber scrap.

6. Process according to claim 4, in which the voids between the resilient particles are filled with the liquid mixture only in the upper half of the layer.

References Cited

UNITED STATES PATENTS 3,272,098    9/1966    Buchholtz et al. _____ 260—3

SAMUEL H. BLECH, Primary Examiner

W. J. BRIGGS, SR., Assistant Examiner

U.S. Cl. X.R.

117—72, 98, 100 C; 161—159, 162; 260—2.3, 2.5 AK, 2.5 B, 2,5 R, 3, 858, 859; 264—128